United States Patent [19]

Dong

[11] Patent Number: 5,893,944
[45] Date of Patent: Apr. 13, 1999

[54] PORTABLE PSA OXYGEN GENERATOR

[76] Inventor: Jung Hyi Dong, 262-13, Namgaza-dong, Seodaemun-ku, Seoul, Rep. of Korea

[21] Appl. No.: 08/966,015

[22] Filed: Nov. 7, 1997

[30] Foreign Application Priority Data

Sep. 30, 1997 [KR] Rep. of Korea ............... 97-50700

[51] Int. Cl.$^6$ ................................ B01D 53/053
[52] U.S. Cl. ..................... 96/114; 96/117; 96/144
[58] Field of Search ............... 96/111–117, 130, 96/144

[56] References Cited

U.S. PATENT DOCUMENTS

| | | | |
|---|---|---|---|
| 2,955,673 | 10/1960 | Kennedy et al. | 96/113 |
| 3,323,291 | 6/1967 | Kern | 96/111 |
| 3,715,866 | 2/1973 | Chatlos et al. | 96/130 X |
| 3,880,616 | 4/1975 | Myers et al. | 96/115 X |
| 4,404,005 | 9/1983 | Hamlin et al. | 96/111 |
| 4,449,990 | 5/1984 | Tedford, Jr. | 96/115 X |
| 4,491,459 | 1/1985 | Pinkerton | 96/113 |
| 4,534,346 | 8/1985 | Schlaechter | 96/144 X |
| 4,545,790 | 10/1985 | Miller et al. | 96/130 X |
| 4,576,616 | 3/1986 | Mottram et al. | 96/113 X |
| 4,584,001 | 4/1986 | Dechene | 96/114 |
| 4,627,860 | 12/1986 | Rowland | 96/111 |
| 4,681,099 | 7/1987 | Sato et al. | 96/130 X |
| 4,793,832 | 12/1988 | Veltman et al. | 96/112 X |
| 4,802,899 | 2/1989 | Vrana et al. | 96/130 X |
| 4,822,384 | 4/1989 | Kato et al. | 96/111 X |
| 4,857,086 | 8/1989 | Kawai | 96/111 |
| 5,071,453 | 12/1991 | Hradek et al. | 96/111 |
| 5,154,737 | 10/1992 | Jenkins et al. | 96/113 X |
| 5,340,381 | 8/1994 | Vorih | 96/130 X |
| 5,474,595 | 12/1995 | McCombs | 96/116 X |
| 5,531,807 | 7/1996 | McCombs | 96/115 X |
| 5,578,115 | 11/1996 | Cole | 96/130 X |
| 5,593,478 | 1/1997 | Hill et al. | 96/111 |
| 5,746,806 | 5/1998 | Aylsworth et al. | 96/111 X |

FOREIGN PATENT DOCUMENTS 4-187210  7/1992  Japan ................ 96/111

Primary Examiner—Robert Spitzer
Attorney, Agent, or Firm—Harrison & Egbert

[57] ABSTRACT

A portable PSA oxygen generator that includes first and second filters for filtering inside air; a fan motor for passing through the air; a third filter for filtering the air intaken through the fan motor; a compressor assembly for compressing the air supplied; an oxygen concentrator for adding/eliminating oxygen to/from the compressed air supplied from the compressor assembly to generate the highly concentrated oxygen; an oxygen tank for storing the oxygen generated in the oxygen concentrator; an oxygen filter for filtering oxygen exhausted; a nitrogen filter for filtering and exhausting nitrogen; a pressure sensor installed inside the oxygen tank and outputting a signal indicating an internal pressure state; a failure alarming circuit made of buzzer connected with the pressure sensor in series, and a light emitting diode; a timer for limiting an operation time; an oxygen sensor for estimating the concentration of the oxygen exhausted through the oxygen filter; a control knob for controlling the concentration of the oxygen; a micro computer connected with the timer, the oxygen sensor and the control knob; and a driving circuit for switching with a signal generated in the micro computer and outputting a control signal to the fan motor which absorbs air.

1 Claim, 3 Drawing Sheets

PORTABLE PSA OXYGEN GENERATOR

FIELD OF THE INVENTION

The present invention relates to a portable pressure swing adsorption (PSA) oxygen generator and, more particularly, to a portable PSA oxygen generator which enables a patient at home to adjust the concentration of oxygen, utilizing for a therapeutic use.

BACKGROUND ART

Conventionally, electrolysis or chemical reaction is used for generating oxygen. But, these methods are unstable and inconvenient to manage. There, clean oxygen is concentrated and separated by repeating adsorbing and eliminating oxygen of 21% in the air through the PSA Process. An example of this is described in U.S. Pat. No. 5,531,807.

This device includes an air separation device in the housing for separating oxygen from the air inside the aircraft, a self-contained compressed air supply in the housing including a compressor operatively connected to the air separation device and a brushless DC motor for driving the compressor; and a circuit for connecting the D-C motor to the aircraft electrical power source including converting the A-C voltage and current on board the aircraft to D-C voltage and current for operating the motor. The device can supply oxygen with a set current value easily operated and selected by a user.

But, with the above conventional invention, it is not easy to control the concentration of oxygen. And the cited invention does not provide a solution to the polluted air.

SUMMARY OF THE INVENTION

Accordingly, the present invention is directed to a portable PSA oxygen generator that substantially obviates one or more of the problems due to limitations and disadvantages of the related art.

An object of the present invention is to provide a portable PSA oxygen generator which can control the concentration of oxygen generated by an oxygen generator very easily.

Another object of the invention is to provide a portable PSA oxygen generator which can clean the polluted air and supply it indoors.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, a portable PSA oxygen generator of the invention includes: first and second filters for filtering inside air; a fan motor for passing through the air; a third filter for filtering the air intaken through the fan motor; a compressor assembly for compressing the air supplied; an oxygen concentrator for adding/eliminating oxygen to/from the compressed air supplied from the compressor assembly to generate the highly concentrated oxygen; an oxygen tank for storing the oxygen generated in the oxygen concentrator; an oxygen filter for filtering oxygen exhausted; a nitrogen filter for filtering and exhausting nitrogen; a pressure sensor installed inside the oxygen tank and outputting a signal indicating an internal pressure state; a failure alarming circuit made of buzzer connected with the pressure sensor in series, and a light emitting diode; a timer for limiting an operation time; an oxygen sensor for estimating the concentration of the oxygen exhausted through the oxygen filter; a control knob for controlling the concentration of the oxygen; a micro computer connected with the timer, the oxygen sensor and the control knob; and a driving circuit for switching with a signal generated in the micro computer and outputting a control signal to the fan motor which absorbs air.

It is to be understood that both the foregoing general description and the following detailed description are exemplary and explanatory and are intended to provide further explanation of the invention as claimed.

BRIEF DESCRIPTION OF THE ATTACHED DRAWINGS

The accompanying drawings, which are included to provide a further understanding of the invention and are incorporated in and constitute a part of this specification, illustrate embodiments of the invention and together with the description serve to explain the principles of the invention.

DETAILED DESCRIPTION OF PREFERRED EMBODIMENT

Reference will now be made in detail to the preferred embodiments of the present invention, examples of which are illustrated in the accompanying drawings.

Figure 1:
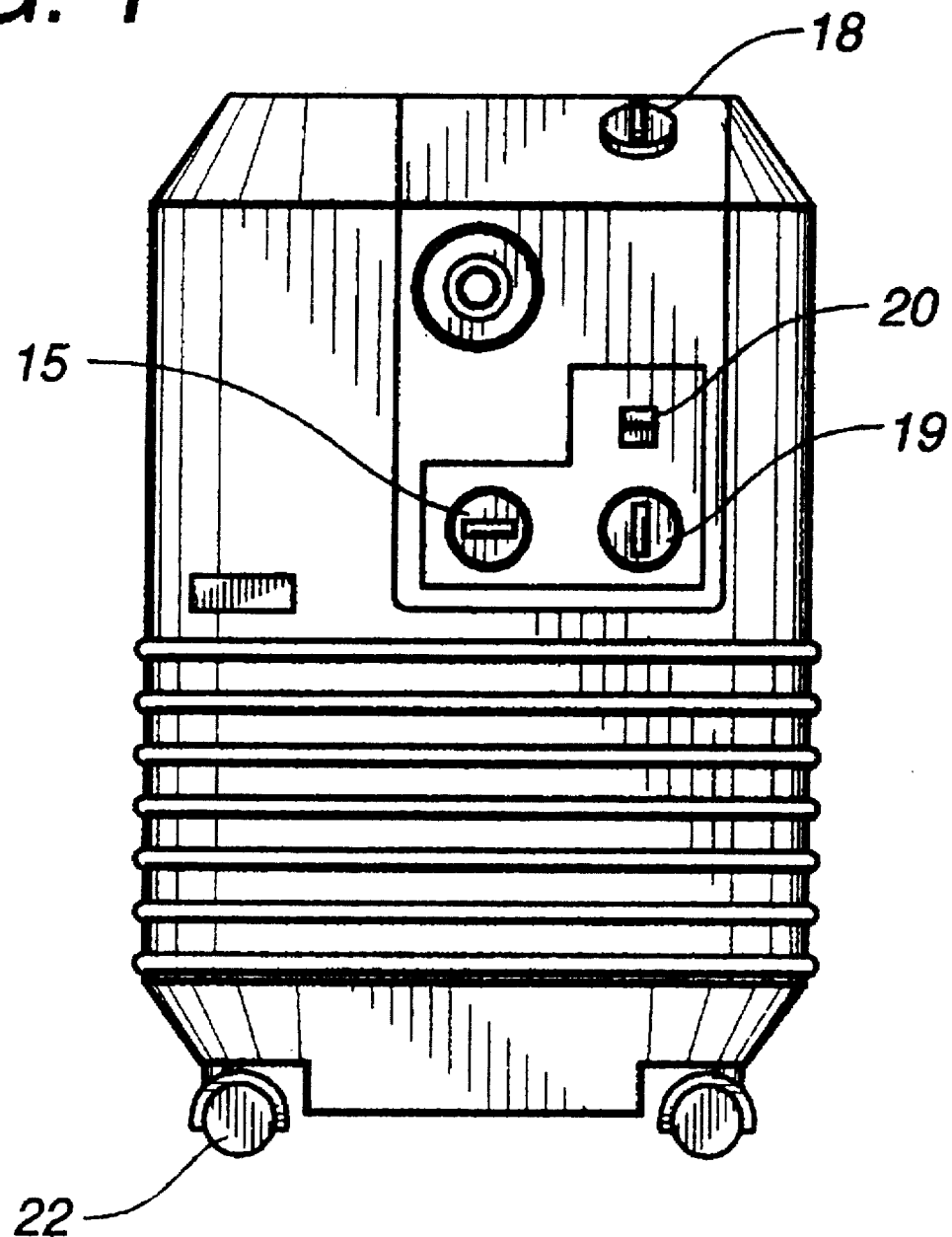
FIG. 1 is a side view of a portable PSA oxygen generator of the invention.

FIG. 1 illustrates a portable PSA oxygen generator of the invention. As shown in the drawing, the invention has an exhaust-amount controlling knob 18 mounted in outer surface of the generator, controlling an amount of current supplied to a fan motor 3 and adjusting its exhausting amount of clean air.

A power switch 20 and a knob 19 of a timer 13 are formed under the exhaust-amount controlling knob 18, and an oxygen-concentration controlling knob 15 is in the left side. A caster 22 is installed on its bottom side, moving to an intended place easily.

Figure 2:
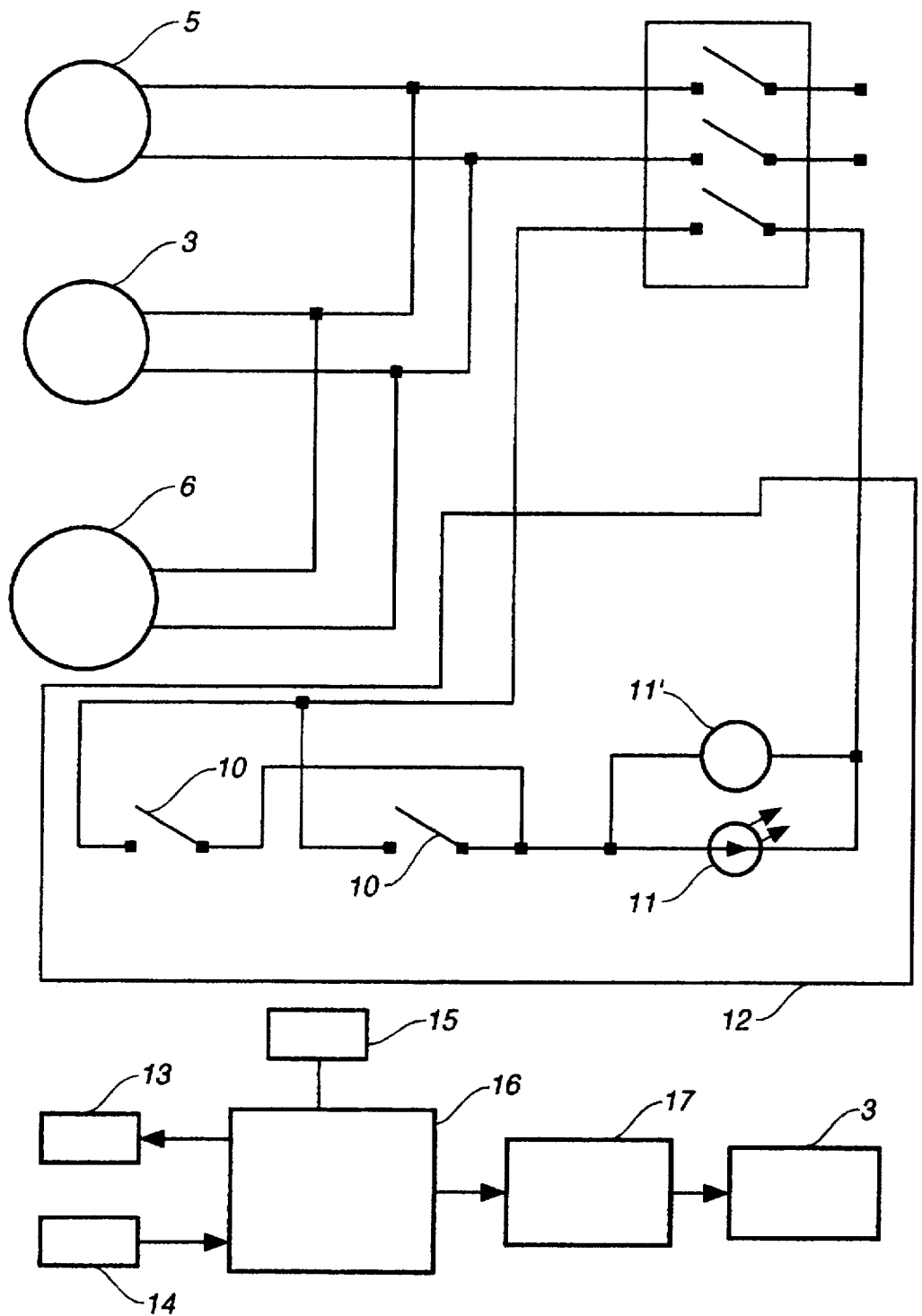
FIG. 2 is a circuit diagram of the portable PSA oxygen generator of the invention.
Figure 3:
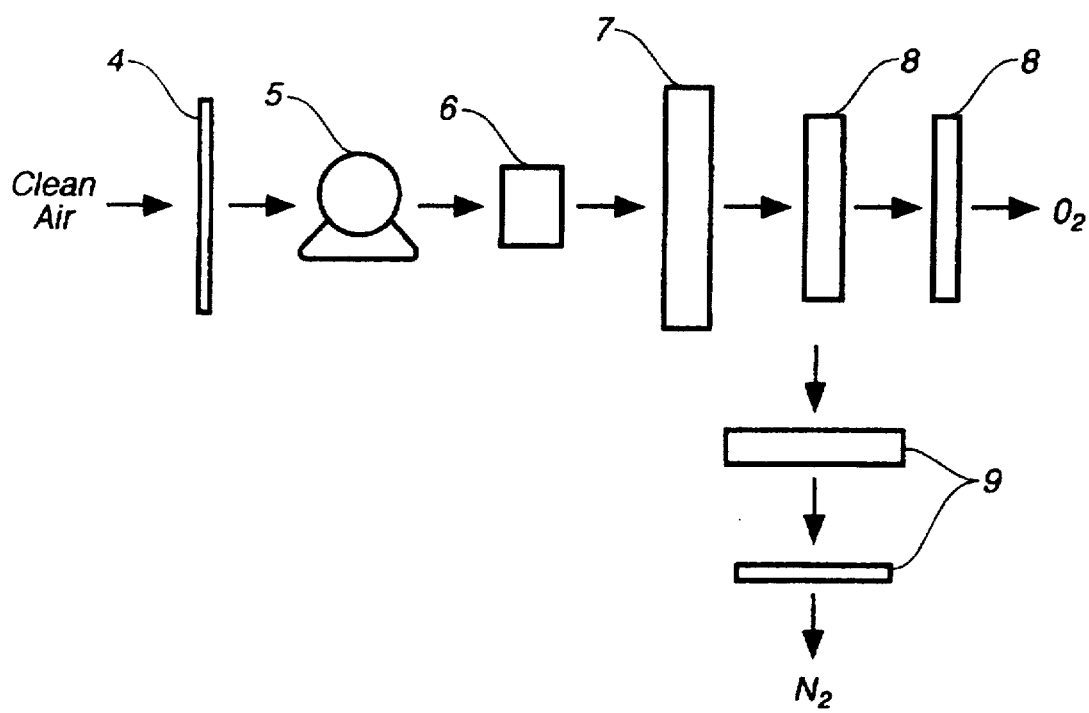
FIG. 3 is a detailed diagram illustrating the arrangement of the portable PSA oxygen generator of the invention.
Figure 3:
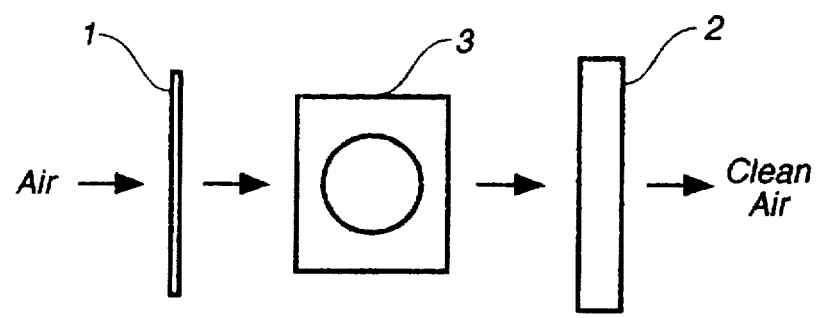

The detailed structure of the invention is shown in FIGS. 2 and 3. The invention includes first and second filters 1 and 2 for filtering inside air; a fan motor 3 for passing through the air; a third filter 4 for filtering the air intaken through the fan motor 3; a compressor assembly 5 for compressing the air supplied; an oxygen concentrator 6 for adding/eliminating oxygen to/from the compressed air supplied from the compressor assembly 5 to generate the highly concentrated oxygen; an oxygen tank 7 for storing the oxygen generated in the oxygen concentrator 6; an oxygen filter 8 for filtering oxygen exhausted; a nitrogen filter 9 for filtering and exhausting nitrogen; a pressure sensor 10 installed inside the oxygen tank 7 and outputting a signal indicating an internal pressure state; a failure alarming circuit 12 made of buzzer 11' connected with the pressure sensor in series, and a light emitting diode 11; a timer 13 for limiting an operation time; an oxygen sensor for estimating the concentration of the oxygen exhausted through the oxygen filter 8; a control knob 15 for controlling the concentration of the oxygen; a micro computer 16 connected with the timer 13, oxygen sensor 14, and the control knob 15; and a driving circuit 17 for switching with a signal generated in the micro computer 16 and outputting a control signal to the fan motor 3 absorbing air.

In the thus-structured invention, if the power switch 20 is turned on, the pressure sensor 10 is accordingly turned on because there is no initial pressure in the oxygen tank 7, so that the buzzer 11' of the failure alarming circuit 12 and the light emitting diode 11 is lighted. In this state, if the compressor assembly 5, the oxygen concentrator 6 and the fan motor 3 operate normally, the oxygen is concentrated and fills up the oxygen tank 7.

Here, the junction point of the pressure sensor 10 is turned off, stopping the operation of the buzzer 11' and the light emitting diode 11. The micro computer 16 scans the states of the timer 13, the oxygen sensor 14 and the control knob 15. Accordingly, if the current operation is performed within the time set through the timer 13, its operation is stopped. If the output value of the oxygen sensor 14 mounted in the side of the oxygen filter 8 is within the value fixed by the control knob 15, its operation is continued. The micro computer 16 cuts off the power source supplied to each circuit and thus makes the operation idle.

As described above, the micro computer 16 recognizes the value set by a user through manipulating the controlling knob 15, compares the set value and the output value of the oxygen sensor, and continues the operation if the set value is higher than the output of the oxygen sensor 14, or stops the operation if the output of the oxygen sensor 14 is higher than the set value, thereby generating oxygen within the scope of the intended concentration.

And, if the oxygen is not supplied to the oxygen tank 7 due to a malfunction, the node of the pressure sensor 10 is turned on, so that the buzzer 11' and the light emitting diode 11 operate and alarm a failure of the system. Therefore, the user can handle the trouble appropriately, enhancing the safety in use.

As described above, on the basis of PSA technique, the micro computer 16 reads the value set by a user and controls the automatic power of the motor fan to control an amount of absorbing air. Therefore, the oxygen is limited in the amount exhausted to thereby generate the appropriate oxygen, so that a patient at home may breathe the oxygen reasonably concentrated without the prescription of a doctor. In addition, the air inside is clean, so as to enhance the health of the user.

It will be apparent to those who skilled in the art that various modifications and variations can be made in the portable pressure swing adsorption oxygen generator of the present invention without departing from the spirit or scope of the invention. Thus, it is intended that the present invention cover the modifications and variations of this invention provided they come within the scope of the appended claim and their equivalents.

What is claimed is:

1. A portable pressure swing adsorption oxygen generator, comprising:

first and second filters for filtering inside air;

a fan motor for passing through the air;

a third filter for filtering the air intaken through the fan motor;

a compressor assembly for compressing the air supplied;

an oxygen concentrator for adding/eliminating oxygen to/from the compressed air supplied from the compressor assembly to generate the highly concentrated oxygen;

an oxygen tank for storing the oxygen generated in the oxygen concentrator;

an oxygen filter for filtering oxygen exhausted;

a nitrogen filter for filtering and exhausting nitrogen;

a pressure sensor installed inside the oxygen tank and outputting a signal indicating an internal pressure state;

a failure alarming circuit made of buzzer connected with the pressure sensor in series, and a light emitting diode;

a timer for limiting an operation time;

an oxygen sensor for estimating the concentration of the oxygen exhausted through the oxygen filter;

a control knob for controlling the concentration of the oxygen;

a micro computer connected with the timer, the oxygen sensor and the control knob; and a driving circuit for switching with a signal generated in the micro computer and outputting a control signal to the fan motor which absorbs air.

* * * * *